(12) United States Patent
Omote et al.

(10) Patent No.: US 7,017,693 B2
(45) Date of Patent: Mar. 28, 2006

(54) DRIVE DEVICE FOR HYBRID VEHICLE

(75) Inventors: Kenji Omote, Anjo (JP); Satoru Wakuta, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 214 days.

(21) Appl. No.: 10/433,978

(22) PCT Filed: Aug. 9, 2002

(86) PCT No.: PCT/JP02/08174

§ 371 (c)(1),
(2), (4) Date: Jun. 10, 2003

(87) PCT Pub. No.: WO03/013893

PCT Pub. Date: Feb. 20, 2003

(65) Prior Publication Data

US 2004/0045752 A1    Mar. 11, 2004

(30) Foreign Application Priority Data

Aug. 10, 2001    (JP) .............................. 2001-244888

(51) Int. Cl.
*B60K 1/00* (2006.01)
(52) U.S. Cl. .................. 180/65.2; 180/65.3; 477/3
(58) Field of Classification Search ............... 180/65.2, 180/65.3, 65.4; 475/5; 192/3.28, 3.32, 3.33, 192/3.31; 477/3
See application file for complete search history.

(56) References Cited

U.S. PATENT DOCUMENTS

| 4,407,398 A | * | 10/1983 | Fiala .............................. 477/5 |
| 4,860,861 A | * | 8/1989 | Gooch et al. ............... 192/3.26 |
| 5,343,970 A | * | 9/1994 | Severinsky ................ 180/65.2 |
| 5,418,437 A | * | 5/1995 | Couture et al. ............. 318/139 |
| 5,713,427 A | * | 2/1998 | Lutz et al. .................. 180/65.4 |
| 5,773,904 A | * | 6/1998 | Schiebold et al. ............ 310/92 |
| 5,789,823 A | | 8/1998 | Sherman |

(Continued)

FOREIGN PATENT DOCUMENTS

DE    10047950 A    5/2001

(Continued)

*Primary Examiner*—J. Allen Shriver
*Assistant Examiner*—Kelly E. Campbell
(74) *Attorney, Agent, or Firm*—Oliff & Berridge PLC

(57) ABSTRACT

A hybrid vehicle drive system is designed to have dimensions that are shorter in an axial direction and improved centering accuracy of a rotor, in order to prevent deterioration of motor performance. A rotor support plate (15) has a flat-plate shaped disk portion (15b), and is fixed to a front cover (32) of a take off device (5), such as a torque converter, or the like, at the disk portion with a set block (67) and a bolt (69). A forward portion of the take off device is centered and supported by fitting a center piece (33) to a crankshaft (3). A support-plate hub (15a) is in contact with the center piece (33) at a small area (33c) in a vicinity of a fixing plane P of the disk portion (15b) and the set block (67), and thus centering of the rotor (13) is executed.

11 Claims, 4 Drawing Sheets

U.S. PATENT DOCUMENTS

| | | | |
|---|---|---|---|
| 6,022,287 A * | 2/2000 | Klemen et al. | 475/5 |
| 6,092,985 A * | 7/2000 | Winkam | 415/124.1 |
| 6,258,001 B1 * | 7/2001 | Wakuta et al. | 475/5 |
| 6,607,048 B1 * | 8/2003 | Ohsawa | 180/65.2 |
| 6,777,837 B1 * | 8/2004 | Tsuzuki et al. | 310/67 R |
| 2001/0013731 A1 * | 8/2001 | Shinohara et al. | 310/85 |
| 2002/0036434 A1 * | 3/2002 | Tsuzuki et al. | 310/83 |

FOREIGN PATENT DOCUMENTS

| | | |
|---|---|---|
| JP | A 5-024447 | 2/1993 |
| JP | 6-144020 A | 5/1994 |
| JP | 2000-152543 | 5/2000 |
| JP | 2000-190748 A | 7/2000 |
| JP | A 2000-272362 | 10/2000 |
| JP | 2001-47882 A | 2/2001 |

* cited by examiner

DRIVE DEVICE FOR HYBRID VEHICLE

BACKGROUND OF THE INVENTION

1. Field of Invention

The invention relates to a drive system for a parallel-type hybrid vehicle with an engine connected to a motor and more particularly, to a hybrid vehicle drive system having an automatic transmission provided with a motor.

2. Description of Related Art

Conventionally, a drive system for a parallel-type hybrid vehicle has an automatic transmission provided with both an engine and a motor/generator. The driving forces of both the engine and the motor/generator are transmitted to the transmission when the vehicle takes off, accelerates, or the like, and the motor/generator functions as a generator for assisting an engine-brake effect when the vehicle runs along a downhill road, brakes, or the like. Further, braking energy is regenerated in order to enhance fuel economy and to reduce the amount of exhaust gas. Such a drive system for a parallel-type hybrid vehicle is disclosed, for example in Laid-open Japanese Patent Application No. Hei. 5-24447 (Related art 1), U.S. Pat. No. 5,789,823 (Related art 2), and Laid-open Japanese Patent Application No. 2000272362 (Related art 3).

The hybrid vehicle drive system disclosed in related arts 1 and 2 is structured such that a rotor of a motor is directly fixed to a torus external diameter portion of a torque converter, and a stator is disposed at an outside diameter side of the rotor. The drive system disclosed in related art 3 is structured such that a rotor is supported at a side wall of a motor housing by a bearing, and a stator is disposed at an external diameter side of the rotor and fixed to the motor housing.

SUMMARY OF THE INVENTION

When the rotor is directly fixed to the torus of the torque converter, axial alignment (centering) of the rotor with respect to the torque converter is executed using an inner peripheral face of the rotor and a torus external diameter face. However, the finishing accuracy is reduced due to the torus external diameter face of the torque converter having a large diameter. A low finishing accuracy of the inner peripheral face of the rotor and the external diameter of the torque converter causes misalignment of the rotational centers of the rotor and the torque converter. In addition, when the torque converter is deformed by centrifugal hydraulic pressure, charge pressure, or the like, the rotor is displaced. To allow for the displacement, a large void (air gap) between the rotor and the stator is required in order to inhibit interference, however this air gap leads to degradation in motor performance.

On the other hand, in the drive system described in related art 3, since the rotor is supported at the motor housing by the bearing, it is possible to reliably establish the positional relationship between the rotor and the stator. As a result, it is possible to prevent a degradation in motor performance caused by the large air gap described above. However, supporting the rotor at the motor housing requires an extension of the side wall of the motor housing between the motor housing and the engine in the internal diameter direction. This requirement combined with the disposal of the bearing leads to an increase in the size of the hybrid vehicle drive system, and in particular, the structure is extended in the axial direction.

Therefore, the invention thus provides a hybrid vehicle drive system designed so as to have a shorter dimension in an axial direction of the drive system, and improved centering accuracy of a rotor in order to prevent degradation of motor performance.

A hybrid vehicle drive system in accordance with a first exemplary aspect of the invention includes an automatic transmission having a take off device, an engine and a motor having a stator and a rotor with an output from the motor and the engine being input to the take off device, wherein the take off device has a front cover and a center piece protruding from the front cover with the center piece centered and supported on an output shaft of the engine, the rotor has a support plate supporting the rotor with the support plate having a disk portion extending in an internal diameter direction, the rotor is centered by contact with the center piece at a small diameter portion of the disk portion and the rotor is fixed to the front cover at the disk portion.

According to the first exemplary aspect of the invention, because centering of the rotor is executed by centering the disk portion of the support plate with the center piece, i.e., the small diameter portion, it becomes possible to reduce the amount of eccentricity of the rotor as compared with the case when the rotor is supported at the external diameter of the take off device, such as with a torque converter, or the like.

Further, the center piece of the take off device is centered with the engine output shaft. Therefore, a run out of the take off device is decreased at an engine side, which make it possible to reduce an amount of eccentricity of the rotor that is centered on the center piece. The combination makes it possible to promote a reduction in the length of the axial direction, and also a decreases the amount of eccentricity of the rotor, thus making it possible to establish a small void (air gap) between the rotor and the stator. This makes enhanced motor performance possible.

It should be noted that the concept of a motor described herein includes not only a device for converting electric energy into rotary motion, i.e., a motor in a narrow sense, but also a device for converting rotary motion into electric energy, i.e., a generator. Further, the term engine herein means a device for converting energy resulting from combustion of fuel into rotary motion, and includes a gasoline engine, a diesel engine, and the like.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
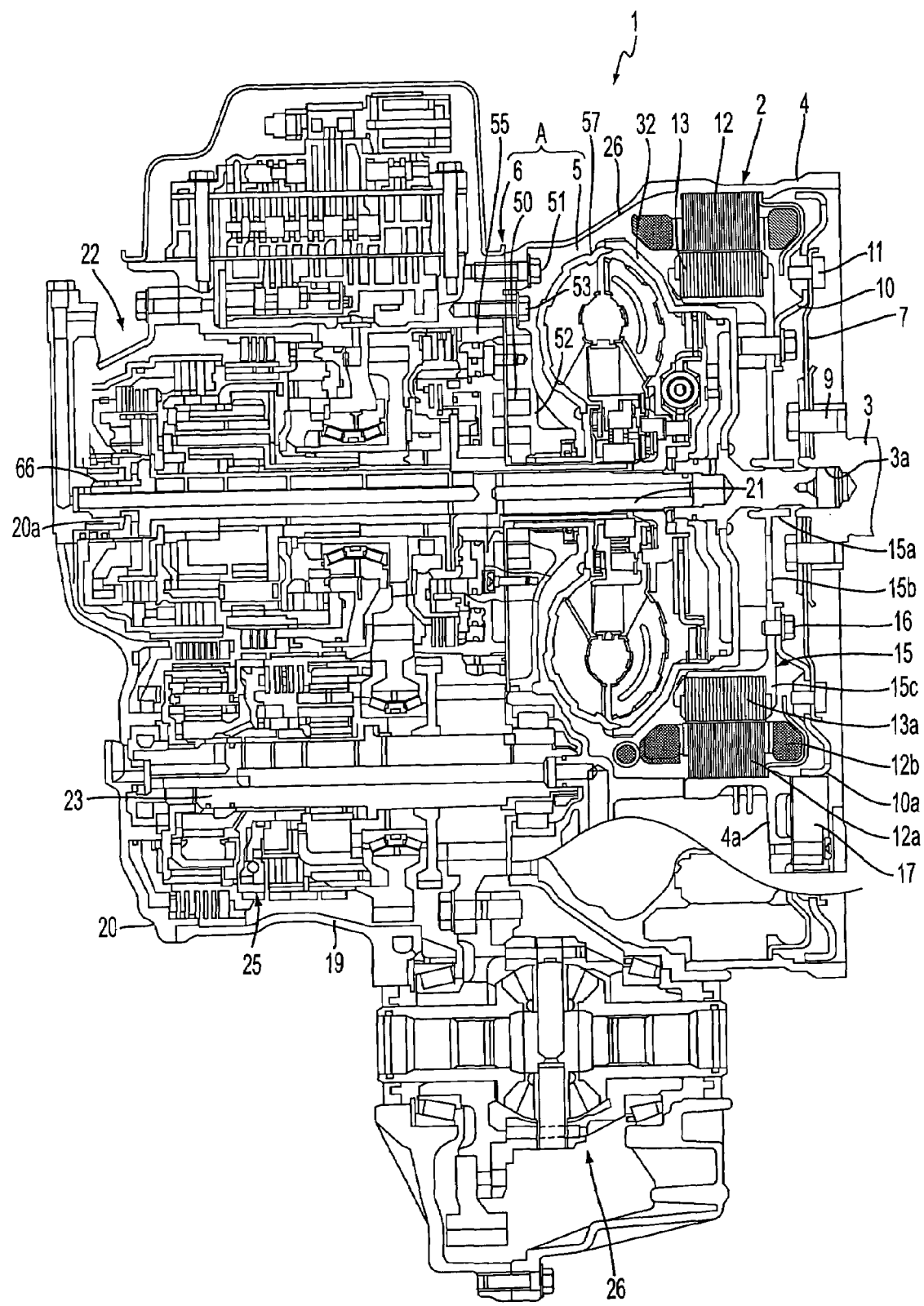
FIG. 1 is a cross section view illustrating a hybrid vehicle drive system in accordance with the invention.
Figure 2:
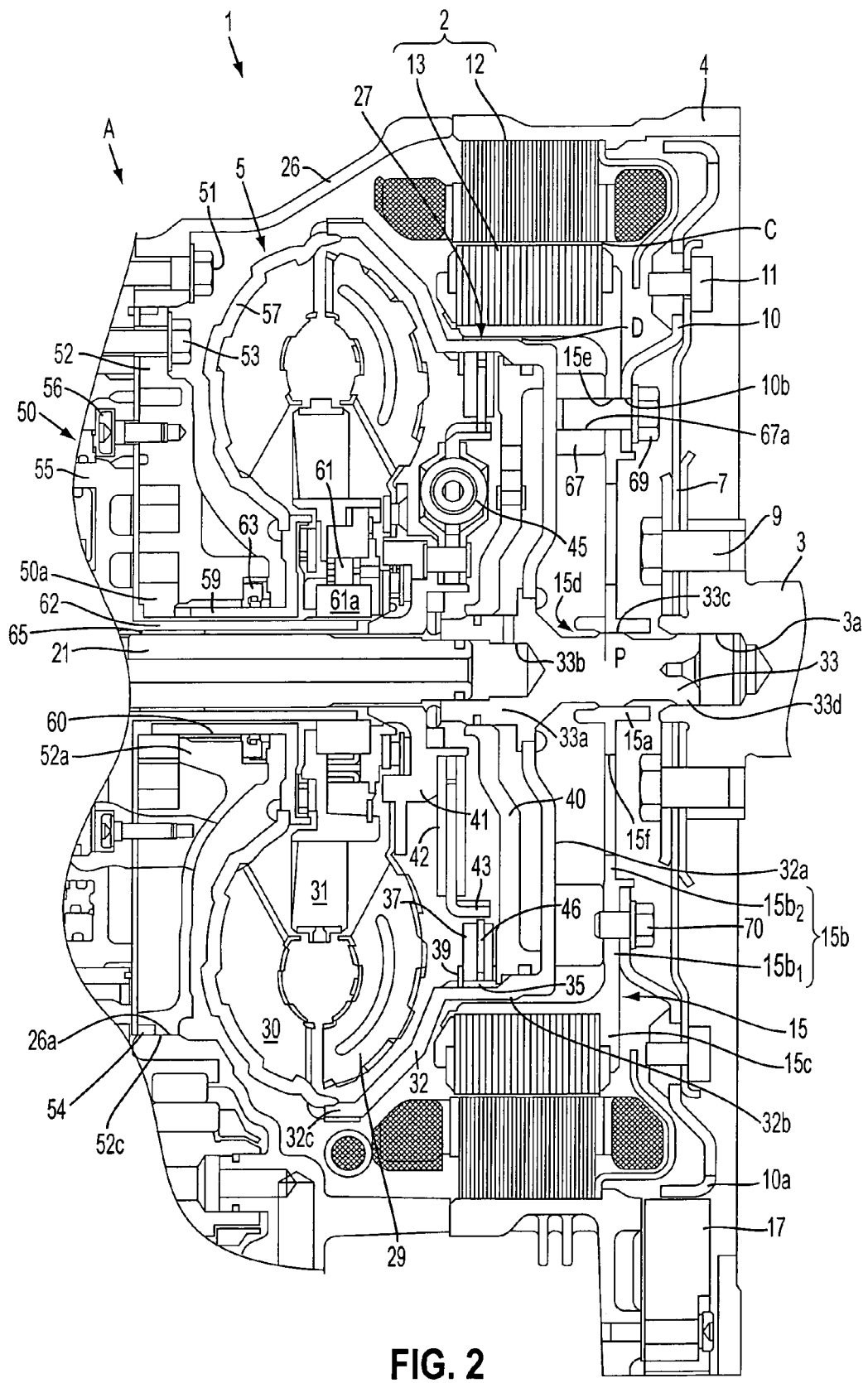
FIG. 2 is an enlarged cross section view illustrating an main portion in FIG. 1.

A first embodiment of the invention will be described below with reference to the accompanying drawings. FIG. 1 is a cross section view illustrating an example of a structure of a hybrid vehicle drive system according to the invention, and FIG. 2 is a view illustrating an main portion of the hybrid vehicle drive system. A hybrid vehicle drive system 1 in which a motor/generator 2 is provided in a torque converter (take off device) of a conventionally used automatic transmission (A/T), includes the motor/generator (motor) 2 and an automatic transmission A. The motor/generator 2 which is housed by a motor housing 4, receives an output of an internal combustion engine, such as a gasoline engine, or the like (only an engine output shaft 3 is shown), and includes a brushless DC motor, and the like. The automatic transmission A receives driving forces transmitted from the engine and the motor/generator 2. In other words, the hybrid vehicle drive system 1 according to the invention has the motor/generator 2, a torque converter 5 of the automatic transmission A, and a multiple speed change mechanism 6 of the automatic transmission A disposed in order from the engine side.

The crankshaft (engine output shaft) 3 extends from the internal combustion engine to the automatic transmission A, and has a leading end portion to which a flexible drive plate 7 is fastened with bolts 9. Further, a flexible input plate 10 is positioned opposite to the drive plate 7 such that the respective leading end portions are fixed and coupled to each other with a bolt 11. The plates 7 and 10 form a flex plate. It should be noted that the crankshaft 3 of the internal combustion engine has a hole portion (recess) 3a bore in its end face (to be described later).

On the other hand, the motor/generator 2 has a stator 12 and a rotor 13, in which the rotor 13 is configured from a plurality of laminated plates 13a embedding a permanent magnet, and a support plate 15 that fixes and supports the laminated plates 13a. The support plate 15 includes tubular hubs 15a each disposed at the rotational center of the plate 15; a disk portion 15b provided continuously from the hub 15a along the drive plate 7; and tubular holding portions 15c each provided continuously from an outer rim portion of the disk portion 15b. The laminated plates 13a are held by the holding portion 15c so as to be arranged in the axial direction.

A plurality of iron cores 12a are fixed to the motor housing 4 so as to be opposite the laminated plates 13a of the rotor. A slight interval exists between the iron cores 12a and the laminated plates 13a. A coil 12b is wound on the iron cores 12a to form the stator 12. It should be noted that the stator 12 is designed to be as large as possible without reducing the minimum height of the vehicle above ground. Further, a predetermined output is ensured in order to provide for multiple poles. Moreover, the laminated plates 13a of the rotor 13 preferably have a strength that is sufficient to overcome centrifugal force, and are preferably disposed opposite the stator 12 with a void (air gap) C (see FIG. 2) in between the laminated plates 13a and the stator 12. This air gap C is as small as possible without any interference arising with the stator 12.

A portion of the input plate 10 described above extends along the side of the stator 12 of the motor/generator 2 toward the external diameter side. A leading end 10a of the plate extension portion is notched in a comb-like form. A sensor 17 is disposed in a position opposite the leading end 10a in the motor housing 4, and detects the extension portion of the plate. Based on this detection, a phase of the rotor 13 of the motor/generator 2 is detected. The sensor 17 is disposed in a leading end (close to the engine) of the motor housing 4 so as to face outward in an external diameter direction. A detection portion of the sensor 17 is disposed in a recess portion formed in an external diameter protrusion portion 4a of the motor housing 4. The sensor 17 accurately detects a rotation position of the rotor 13 in order to control a timing of the passage of current through the stator 12. Such a sensor 17 detects the rotation position of the rotor 13 so as to make it possible to maintain the performance of the motor/generator 2 and to positively prevent reverse rotation at the time of start-up. However, there is no need to provide extra space extending in the axial direction for mounting the sensor 17. Accordingly, it is possible to prevent an increase of the entire length.

On the other hand, the aforementioned automatic transmission A is constituted by the torque converter (hydraulic power transmission) 5 and the multiple speed change mechanism 6. The multiple speed change mechanism 6 is housed in a transmission case 19 and a rear case 20, and includes a main speed-change mechanism 22 disposed coaxially with an input shaft 21, a secondary speed-change mechanism 25 disposed coaxially with a countershaft 23 extending in parallel to the input shaft 21, and a differential unit 26 disposed coaxially with a front-wheel driving shaft. The multiple speed change mechanism 6 is a FF (Front-engine Front-drive) type, in which the above speed-change mechanisms 22 and 25, and the differential unit 26, and so on, are housed in the case 19 which is dividable.

Moreover, as illustrated in detail in FIG. 2, the torque converter 5 serving as a take off device is housed in a converter (take off device) housing 26, and has a lockup clutch 27, a turbine runner 29, a pump impeller 30, a stator 31, and a front cover (torus front outer-shell portion) 32 covering the other members. A center piece 33 is secured in a rotation center portion on an external side of the cover 32.

Among the above members, the front cover 32 includes an internal diameter portion 32a shaped like a disk and disposed so as to be alongside the disk portion 15b of the rotor 13; a tubular-shaped middle portion 32b provided continuously from the outer rim of the internal diameter portion 32a so as to extend along the holding portion 15c; and an external diameter portion 32c provided continuously from the middle portion 32b and formed along an outside shape of the turbine runner 29 and fixed to the pump impeller 30. It should be noted that the aforementioned stator 12 and rotor 13 are positioned so as to be at an external diameter side of the middle portion 32b of the front cover 32, and substantially in alignment (overlapping) with each other in the axial direction. In addition, the rotor support plates 15 are aligned with the center and supported in such a way as to have a predetermined space D between the inner peripheral face of the holding portion 15c of the rotor supporting plate 15 and the outer peripheral face of the front-cover middle portion 32b.

Moreover, the lock-up clutch 27 is accommodated and disposed at an internal diameter side of the middle portion 32b of the front cover 32, and a spline 35 extending in the axial direction is integrally formed on an inner peripheral face of the middle portion 32b of the front cover. The spline 35 is engaged with a plurality of outer friction plates 37, and the outer friction plates 37 are prevented from slipping out of position by a snap ring 39. In addition, a piston plate 40 is movably disposed so as to be oil-tight between the inner peripheral face of the middle portion 32b and the outer peripheral face of a lock-up piston hub 33a that is integral with the center piece 33. Further, a hub 41 connected to the turbine runner 29 is splined and coupled to the input shaft 21 disposed in the vicinity of the lock-up piston hub 33a. The hub 41 has two disks 42 fixed thereto. In turn, the disks 42 support a clutch hub 43, and a damper spring 45 is interposed among the disks 42 and the clutch hub 43 to form a spring damper for absorbing impact rotation. The clutch hub 43 extends in an external diameter direction and is bent in the axial direction. The bent portion of the hub 43 is splined, and an inner friction plate 46 is coupled to the splined portion. In other words, the outer and inner friction plates 37 and 46 constitute a multi-plate clutch for the lock-up clutch. In addition, the piston plate 40 is moved by applying or releasing a predetermined hydraulic pressure to an oil chamber which is formed by the piston plate 40 and the internal diameter portion 32*a* of the front cover. Accordingly, a pressing force applied to the outer friction plate 37 of the piston plate 40 is controlled, resulting in the control of connection, release, or slipping of the friction plates 37 and 46.

It should be noted that the lock-up clutch 27 has a smaller diameter than that of the torus constituted by the outer shells of the turbine runner 29 and pump impeller 30 of the torque converter 5. More specifically, the lock-up clutch 27 is disposed such that the friction plates are positioned in a substantially central portion of the radial direction of the torus. In addition, the lock-up clutch 27 is small enough in diameter to be fitted in to the space inward of the motor/generator 2. However, since the lock-up clutch is a multi-plate clutch, even when both the motor/generator 2 and the internal combustion engine are driven, the lock-up clutch 27 has a torque capacity that reliably transmits the driving forces from the motor/generator 2 and the internal combustion engine to the input shaft 21.

Further, an oil pump 50 is disposed between the torque converter 5 and the multiple speed change mechanism 6. The converter housing 26 and the transmission case 19 are integrally coupled to each other by a plurality of bolts 51, and together with the motor housing 4 constitute an integrated case. Further, the transmission case is integrally coupled to a pump case 52 by a plurality of bolts 53. In turn, the pump case 52 is integrally coupled to a pump cover 55 by a bolt 56. The pump case 52 has an outer peripheral face 52*a* fitting with the inner peripheral face 26*a* of the converter housing 26 so as to provide for positioning of the pump case 52, and also has an O-ring 54 interposed and is structured in an oil-tight manner. In addition, a rear cover 57 that is welded to the front cover 32 is provided integrally with the outer shell of the pump impeller 30. In addition, a sleeve-shaped impeller hub 59 is integrally fixed by welding to an internal diameter portion of the rear cover 57. Further, the rear cover 57 is integrally fixed by welding to the front cover 32 to form the outer shell (torus) of the torque converter 5.

Further the impeller hub 59 integrated with the rear cover 57 is rotatably supported through a bush 60 on an inner peripheral face of the outer peripheral face 52*a* of the pump case 52 that is integrated with the converter housing 26 and transmission case 19, and has a leading end coupled to a rotor 50*a* of the oil pump 50. In other words, the outer-shell rear portion of the torque converter 5 is rotatably supported in the pump case 52 integrated with the converter housing 26 via the bush 60.

Moreover, the stator 31 is connected to a one-way clutch 61. An inner race 61*a* of the one-way clutch is splined and coupled to a sleeve shaft 62, and a leading end of this sleeve shaft 62 is splined and fixed to the pump cover 55. In addition, an oil seal 63 is fitted between the impeller hub 59 and the pump case 52. Further, in the internal diameter portion of the oil pump 50, a bush or needle 65 is interposed between the sleeve shaft 62 and the input shaft 21, such that the input shaft 21 is indirectly supported via the sleeve shaft 62 by the pump case 52 and cover 55 that are integrated. On the other hand, a rear end portion of the input shaft 21 is supported at the hub 20*a* formed in the rear case 20 (refer to FIG. 1) via the bearing 66.

Further, the leading end portion of the input shaft 21 is inserted into a rear hole 33*b* formed in the center piece 33 of the torque converter, such that an O-ring comes into contact therewith. Next, the rear hole 33*b* is fitted over the input shaft 21 and the front part of the center piece 33 is fitted into the hole portion 3*a* of the crankshaft 3, and thus the center piece 33 is supported between the input shaft 21 and the crankshaft 3. That is to say, the outer-shell front portion of the torque converter 5 is supported by the crankshaft 3 via the centerpiece 33. Note that, the crankshaft 3 is rotatably supported by the engine body (including an engine block and an engine case, not shown) via a bearing made of metal, or the like.

Moreover, a protruding portion of the center piece 33 has an enlarged diameter portion 33*c*, which is a central portion with an enlarged diameter. The hub 15*a* of the rotor support plate 15 defines a hollow portion 15*d* through which the center piece 33 extends. The hub 15*a* of the rotor support plate 15 is placed in contact with the enlarged diameter portion 33*c* at the hollow portion 15*d* in order to support the support plate 15. In addition, the protrusion of the center piece 33 has a leading end with an enlarged diameter, which is an enlarged diameter portion 33*d*. The hole portion 3*a* of the crankshaft 3 is placed in contact with this enlarged diameter portion 33*d* in order to support the center piece 33. That is to say, due to contact occurring between relatively small areas in the axial direction of the enlarged diameter portion 33*c*, which is substantially shaped like a flat plate, of the center piece 33 and the hub 15*a*, the rotor support plate 15 and the center piece 33 are not restricted with respect to their inclination with regard to each other (inclination does not occur integrally as is the case with press-fitting), and axial alignment (centering) of the rotor support plate 15 is executed at a small diameter portion extending at an internal diameter of the rotor 13, and the rotor 13 is supported. Moreover, the center piece 33 has a predetermined degree of inclination permitted by the enlarged diameter portion 33*d* and has axial alignment (centering) executed with respect to the crankshaft 3, and is supported by the crankshaft 3.

Moreover, the internal diameter portion 32*a* of the front cover 32 has an external diameter portion to which a set block 67 is fixed and attached. The set block 67 has a screw hole 67*a* formed therein. A bolt 69 passes through a hole 15*e* formed in the rotor support plate 15 and a hole lob formed in the input plate 10, and is tightly screwed in the screw hole 67*a*, in order to integrally fix the front cover 32, the rotor support plate 15 and the input plate 10. Note that, the rotor support plate 15 and the input plate 10 are fixed integrally together with the bolt 70. As a result, the rotor 13 is communicated with the external diameter side of the front cover 32. This makes it possible to transmit a large torque using a small force, as compared with the case in which the rotor is communicated with a central portion. Moreover, it is also possible to achieve a compact configuration for the fixing portions (connection portions), such as the set block 67, the bolt 69, and so on, thus allowing a weight reduction.

The disk portion 15*b* of the rotor support plate 15 has an external diameter side $15b_1$, from a fixing position (hole 15*e*) fixed with the bolt 69 that is formed with increased thickness, and an internal diameter side $15b2$ from the fixing position (hole 15*e*) that has relatively small thickness and has a predetermined number of weight-reduction holes 15*f* formed therein. With this configuration, torque is transmitted between the motor/generator 2 and the torque converter 5 through the external diameter side $15b_1$, of the support plate 15. In addition, the internal diameter side $15b_2$ from the fixing position, which plays no role in torque transmission, is required to have sufficient strength for the centering of the rotor 13. Thus, weight reduction is promoted by reducing the diameter of the internal diameter side and forming the weight-reduction holes 15*f* therein while maintaining the necessary strength.

Hereinafter, the operation of the hybrid vehicle drive system 1 as described will be explained. When a vehicle is at rest, a driver turns on an ignition switch, not shown, and depresses an accelerator pedal (when a throttle opening degree is low), whereupon current flows from a battery, not shown, to the motor/generator 2 to allow the motor/generator 2 to function as the motor. More specifically, a controller, not shown, passes current through the coil of the stator 12 with suitable timing in response to a signal (a position of the rotor 13) from the sensor 17, whereupon the rotor 13 rotates in a forward direction at a high rate of efficiency. Then, the rotational driving force is transmitted through the support plate 15, the bolt 69 and the set block 67 to the torque converter 5. The rotational driving force in then increased by a predetermined torque ratio in the torque converter 5, and then transmitted to the input shaft 21.

When the vehicle takes off, a fuel injection apparatus of an internal combustion engine is not actuated and the engine is stopped, so that the vehicle takes off by the driving force from the motor/generator 2 alone. Since the support plate 15 is rotated as described above, the crankshaft 3 is rotated through the input plate 10 and the drive plate 7. As a result, a piston reciprocates, thus repeating compression and discharge of air in a cylinder chamber. At this point, the motor/generator 2 has an operation characteristic of outputting a high torque at a low RPM. This is combined with an increase in a torque ratio of the torque converter 5 and a high torque ratio due to a first speed of the multiple speed change mechanism 6. Thus, smooth take off and running of the vehicle with a predetermined torque occurs.

Then, even at a relatively low vehicle speed immediately after the vehicle takes off, when the accelerator pedal is depressed and the throttle opening degree increased to a fixed opening degree or more, in order to accelerate or travel uphill, the fuel injection apparatus is actuated and the motor/generator 2 functions as a starting motor for igniting a sparking plug for starting the internal combustion engine. Thereby, the crankshaft 3 is rotated, and the rotation driving force is transmitted through the drive plate 7 and the input plate 10 to the support plate 15. Then, driving forces of both the internal combustion engine and the motor/generator 2 functioning as the motor are added together and transmitted to the torque converter 5 to move the vehicle with a large driving force. At this time, the multiple speed change mechanism 6 is upshifted so that rotation at a desired rotational speed is transmitted to driving wheels.

Then, when the vehicle is running at a high speed in a steady state, the motor/generator 2 is idled (the motor output is controlled in such a way as to cancel out torque generated by a back electromotive force produced in the motor), so that the motor/generator 2 is freely rotated. This leads the vehicle to be run by the driving force produced by the internal combustion engine alone.

It should be noted that, when the battery has a low state of charge (SOC), the motor/generator 2 functions as a generator to recharge the battery. In a driving state when the vehicle is being driven by the internal combustion engine or a driving state when the vehicle is being driven by the internal combustion engine with the assistance of the motor (or in certain circumstances, a driving state using the motor alone), a lock-up ON pressure is applied to move the piston plate 40, thus causing engagement of the multi-plate clutch (the outer friction plate 37 and the inner friction plate 46). With this engagement, the torque transmitted to the front cover 32 is directly transmitted to the input shaft 21 via the spline 35, the outer friction plate 37, the inner friction plate 46, the hub 43, the damper spring 45, the disk 42 and the turbine hub 41, without transmitting through oil flow in the torque converter.

Furthermore, when the output of the internal combustion engine is higher than required for running downhill or running at low or intermediate speeds in a steady state, the motor/generator 2 functions as the generator in accordance with the SOC of the battery, and recharges the battery. In particular, when engine brake is required for running downhill, electrical power regenerated in the motor/generator 2 operating as the generator is increased in order to make it possible to obtain an adequate engine-brake effect. Further, when the driver depresses the brake pedal to decelerate the vehicle, the regenerated electric power of the motor/generator 2 further increases, thus allowing the motor/generator 2 to operate as a regenerative brake. Accordingly, inertia energy of the vehicle is regenerated as electric power, and also the braking force produced by a friction brake is decreased, thus reducing the energy expended by heat dissipation. Moreover, at intermediate vehicle speeds, the motor/generator 2 is switched to a regeneration mode in which the engine can be operated in a high output/high efficiency range. This makes it possible to improve the efficiency of the engine. Moreover, it is possible to increase motor running, based on the above described charging of the battery by regeneration. Accordingly, an improvement in energy efficiency can be obtained.

In addition, when the vehicle is halted at a traffic signal, or the like, the motor/generator 2 is stopped and the fuel injection apparatus is turned off in order to stop the internal combustion engine. In short, the conventional idling conditions of the engine are eliminated. Then, when the vehicle takes off from the halted state, as described above, the vehicle is started first by the motor driving force of the motor/generator 2, and immediately after this when at a relatively low speed, the engine is started by the motor driving force, and assisted by the driving force of the motor 2 so as to eliminate abrupt variations in the driving force of the engine. As a result, the vehicle is smoothly driven. Then, when the engine brake is required and when braking to stop, the motor/generator 2 serves as the regenerative brake for regeneration of vehicle inertia energy as electric energy. Further, motor running takes place when the vehicle is in a low engine efficiency range, such as when the engine has low load or extremely low load. Due to the above combination, the hybrid vehicle is able to achieve fuel saving and exhaust gas reduction.

In addition, it is clearly obvious that the hybrid vehicle drive system 1 is not limited to the aforementioned operation patterns. For example, the internal combustion engine may be similarly stopped when the vehicle is halted, but when the vehicle takes off, the internal combustion engine may be started by the motor/generator 2, and the driving force of the internal combustion engine may be assisted by the driving force supplied by the motor/generator 2, in order to execute take off of the vehicle. Further, in the case of the above embodiment, an example is given in which the invention is applied to an FF-type automatic transmission A. However, it goes without saying that the invention is not limited to the aforementioned embodiment, and may be applied to an FR-type automatic transmission or a CVT-type automatic transmission.

Further, as described above, the hybrid vehicle drive system 1 has a structure having the motor/generator 2 provided in the automatic transmission A. Accordingly, with respect to mounting in the vehicle, the automatic transmission A is desirably accommodated in the same space as the conventional automatic transmission. Further, the motor/generator 2 preferably exerts the aforementioned functions in the above limited space. For this purpose, the void (air gap) between the rotor 13 and the stator 12 is decreased in order to enhance motor performance. Accordingly, improvement in the accuracy of supporting the rotor 13 is important.

Accordingly, with regard to support of the rotor 13 of the motor/generator 2, the support plate 15 supporting the rotor 13 is centered by the contact of the center piece 33 with the hub 15a at the hollow portion 15d of the small diameter portion of the disk portion 15b formed in the substantially flat plate shape. Further, the center piece 33 is supported by the engine crankshaft 3. Hence, since the rotor 13 is supported by the inner diameter small center piece of the torque converter 5, the amount of eccentricity of the torque converter 5 and the rotor 13 is small, and the void (air gap) between the rotor 13 and the stator 12 is small, as compared with the case when centering is executed using the torus external diameter portion of the torque converter. As a result, it is possible to obtain improved efficiency of the motor/generator 2.

In addition, when the rotor support plate 15 is fitted in the center piece 33 for assembly, the rotor support plate 15 does not come in contact with the torque converter except for the portion at which the inner peripheral face of the hub 15a is in contact with the outer peripheral face of the center piece 33. If a portion of the rotor support plate 15 comes into contact with the torque converter in the radial direction apart from at the center piece 33, the portion concerned comes into contact earlier and centering is executed thereon. This may cause a deterioration in centering accuracy. However, as described above, the rotor support plate is in reliable contact with the center piece serving as the portion for central alignment. Accordingly, accurate centering is made possible. Further, the rotor support plate is adjusted in the centered state, and fixed to the set block 67 by the bolt 69 passing through the hole 15e.

Figure 3:
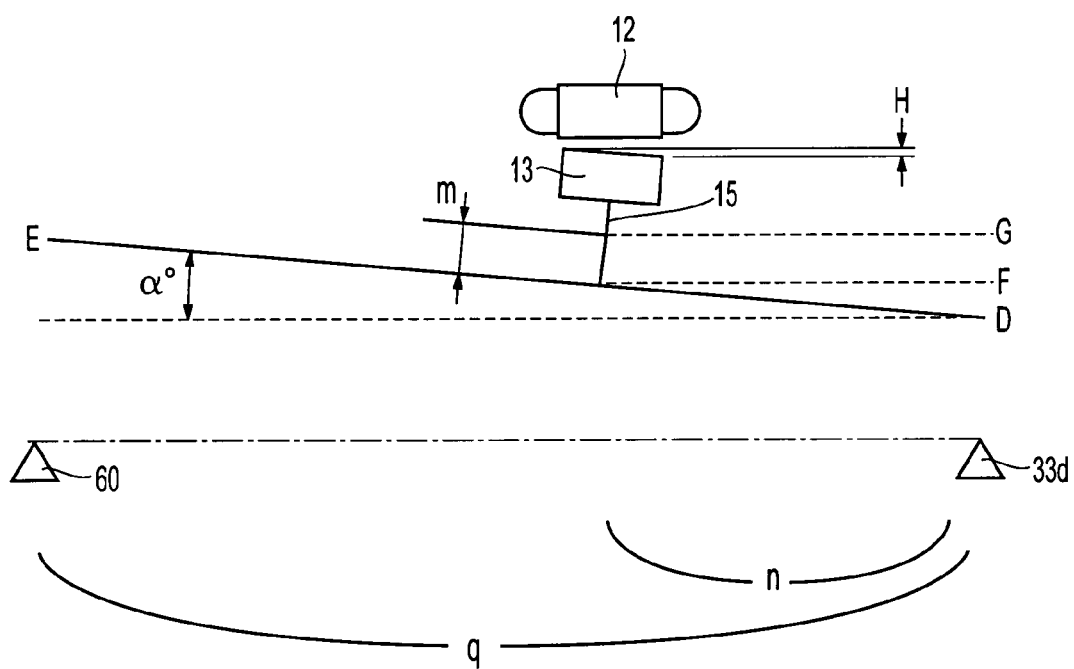
FIG. 3 is a schematic diagram illustrating the accuracy in supporting a rotor.

Next, support of the motor rotor is described with reference to FIG. 3. The motor housing 4 is positioned and secured on the engine body by a dowel pin. Calculation is performed with reference to the dowel pin to obtain a maximum value for an amount of eccentricity of the front side (the engine side) and the rear side (the multi-speed shift mechanism side) of the torque converter 5, i.e., the front cover 32 and the rear cover 57 which are integrated to form the outer shell (torus) of the torque converter 5. The front side is centered with respect to the enlarged diameter portion 33d of the center piece 33 and the crankshaft 3. With regard to the rear side, the impeller hub 59 is centered via the bush 60 with respect to the pump case 52 fixed to the transmission case 19.

Hence, the front side has a maximum amount of eccentricity of a value D that is derived by addition of a, b, c and d (=a+b+c+d), where, a is a positional accuracy of a dowel hole of the motor housing, b is play of the dowel pin, c is a runout of the engine crankshaft 3 relative to the dowel-pin position, and d is an amount of eccentricity caused by a crankshaft clearance. As compared to this, the rear side has a maximum amount of eccentricity of a value E that is derived by addition of e, f, g, h, i, j, and k (=e+f+g+h+i+j+k), where e is a runout of the pump impeller hub 59, f is a clearance between the pump-case outer peripheral face 52a and the bush 60, g is a runout of the internal diameter of the bush 60, h is eccentricity caused by the clearance between the pump case 52 and the converter housing 26, i is an internal diameter position of the converter housing 26, j is a positional accuracy of dowel holes of the converter housing and the motor housing 4, and k is play of the dowel pin. As a result of the above calculations, the amount of front side eccentricity D becomes lower than the amount of rear side eccentricity E by a predetermined amount (D<E).

Further, an amount of eccentricity F of the rotor 13 is calculated, where n is a distance to the rotor support plates 15 from the supporting portion (enlarged diameter portion 33d) of the center piece 33 and the crankshaft 3, q is a distance to the bush 60, and m is an amount of eccentricity caused by a clearance between the rotor support plate (the hub 15a) and the center piece (the enlarged diameter portion), and a degree of coaxiality of the center piece 33. Further, the amount of eccentricity G is obtained by adding the amount of eccentricity m to the amount of eccentricity F, and further an amount H is calculated based on an inclination that takes into account the width (the length in the axial direction) of the rotor. An amount resulting from the addition of the above values (G+H) is the amount of rotor eccentricity.

Accordingly, placing the rotor support plate 15 in a position on the front side, i.e., the engine side, leads to improvement in axial supporting accuracy of the rotor. Furthermore, when the rotor support plate 15 is fixed by tightening the set block 67 and the bolt 69, even if the rotor support plate 15 is inclined with respect to the outer peripheral face of the center piece 33 due to a degree of flatness accuracy of the end face of the set block and the side face of the support-plate disk portion 15b which are the contact faces, the center-piece enlarged diameter portion 33c and the support-plate hub 15a are in contact with each other at the small area in proximity to a plane P that is on the same plane as the end face (the aforementioned contact face) of the set block. For this reason, a compelling force (restraining) is not exerted with respect to the inclination, thus making it possible to retain high centering accuracy.

Further, the hub 15a of the rotor support plate 15 is inserted so as to be relatively movably in the axial direction with respect to the center piece 33, and the rotor 13 is centered with respect to the torque converter 5. The outer shell (the front cover 32, and so on) of the torque converter 5 is deformed by change in centrifugal hydraulic pressure and charge pressure. In particular, in terms of the amount of deformation, deformation in the axial direction is large at the central portion of rotation. Hence, the center piece 33 moves in the axial direction, but the center piece 33 and the rotor support plate 15 are supported so as to be relatively movably as described above. As a result, the movement of the center piece 33 in the axial direction has no affect on the accuracy in supporting the rotor 13.

Still further, the rotor 13 is fixed to the internal diameter portion 32a of the front cover 32. Specifically, the disk portion 15b of the rotor support plate is fixed to the internal diameter portion 32a of the front cover 32 opposite the disk portion 15b, i.e., the external diameter side of the front cover 32, by the bolt 69 and the set block 67. Hence, as described above, the deformation of the torque converter 5 is large at the central portion in the rotational direction thereof, and is small at the external diameter of the front cover 32. As a result, the support accuracy of the rotor 13 mounted at the external diameter of the front cover is only affected to a limited degree by the deformation of the torque converter 5.

Next, a second embodiment according to the invention will be described with reference to FIG. 4. It should be noted that, the present embodiment has a different take off device from that of the aforementioned first embodiment. However, since the structure for supporting the motor and the rotor of the motor, and so on, is the same as that in the first embodiment, the same reference numerals are designated and a description of the structure is omitted here.

As in the case of the aforementioned embodiment, a hybrid vehicle drive system $1_2$ of this embodiment includes the motor/generator 2 provided in a take off device $5_2$ of an automatic transmission, in which power is transmitted from the crankshaft 3 and the rotor 13 of the motor/generator 2 through the take off device $5_2$ to a multi-speed shift mechanism of the automatic transmission. The motor/generator 2 and the take off device $5_2$ are housed respectively in the motor housing 4 and a take off device housing $26_2$ that are abutted against each other to form one piece. The rotor 13 is supported by the rotor support plate 15 including the disk portion 15b, the hub 15a and the holding portion 15c. Note that, the take off device housing $26_2$ may be formed integrally with or separately from a transmission case housing the multispeed shift mechanism.

In turn, the rotor support plate 15 has the holding portion 15c directly coupled to the drive plate 7 with the bolt 11. For this reason, torque from the crankshaft 3 is transmitted via the drive plate 7, the rotor support plate 15, and secure portions such as the bolt 69, the set block 67 to a front cover 32 of the take off device $5_2$, in which the drive plate constitutes a flex plate. Further, the disk portion 15b to the internal diameter side of the secure portion (hole 15e) is not acted upon by torque from the engine and the motor 2, and functions exclusively for centering and support of the motor rotor 13.

The take off device $5_2$ has a take off clutch and a damper unit 91, and is housed in a housing 93 forming an outer shell. The housing 93 is constituted by the front cover 32 and a rear cover $57_2$ welded integrally together. Further, a center piece 33 is integrally fixed to the front central portion of the front cover 32, and a hub $59_2$ is integrally fixed to a back central portion of the rear cover $57_2$. Then, similar to the case of the aforementioned embodiment, a front part of the housing 93 forming the outer shell is supported at the center piece 33 by the crankshaft 3, and similarly, the back part thereof is supported by the hub $59_2$ at a pump case 52, via a bush 60.

The center piece 33 has a protruding portion 33g fitting into the engine crankshaft 3; a hub 33h; and a disk portion (front face portion) 33i extending outward in the external diameter direction in a flat plate shape. Moreover, the front cover 32 includes a front face portion 32a welded to an outer peripheral face of the disk portion 33i; a middle tubular portion 32b bent at substantially 90 degrees relative to the front face portion and extending backward in the axial direction; and an external diameter portion 32c rising, at an angle of substantially 90 degrees from a back end of the middle tubular portion, outward in the external diameter direction and extending backward substantially in the axial direction.

The rear cover $57_2$ is welded to one end of the external diameter portion 32c of the front cover 32, and formed in a bracket shape, and has a rear face portion $57_2a$. In turn, the rear hub $59_2$ is welded to the inner peripheral face of the rear cover $57_2$ and extends in the axial direction.

The housing 93 accommodates a take off clutch 90, a hydraulic actuator 94 for operating the clutch, and the damper unit 91. The take off clutch 90 is constituted by a wet-type multi-plate clutch (WSC) having a plurality of clutch plates 95 and clutch disks 96 alternately arranged in the axial direction. Although the take off clutch 90 is small enough in diameter to be fitted into a space to the inward side of the motor/generator 2, it is a multi-plate clutch and therefore even when both the motor/generator 2 and the internal combustion engine 3 are driven, the take off clutch 90 is capable of reliably transmitting the driving forces of both the motor/generator 2 and the internal combustion engine 3 to the input shaft 21.

A spline 35 is further formed directly on an inner peripheral face of the middle tubular portion 32b of the front cover 32. The clutch plates 95 serving as outer friction plates are engaged with the spline 35 and are prevented from slipping out of place by a snap ring 92. On the other hand, a tubular clutch hub 97 is disposed at an internal diameter side of the middle tubular portion 32b. The clutch disks 96 serving as inner friction plates are engaged with a spline formed at an outer peripheral face of the hub 97.

The center piece 33 has an annular recess groove for a seal formed at the outer peripheral face of the disk portion 33i positioned at the inner side of the front cover 32, and furthermore, an annular recess groove is formed on the outer peripheral face of the hub 33h. Further, a piston 99 is fitted so as to be oil-tight by O-rings 100 and 101, respectively mounted in the above two annular recess grooves. An oil chamber constituting the hydraulic actuator 94 is formed between the piston 99 and a cylinder constituted by the disk portion 33i and the hub portion 33h. The piston 99 has a clutch operating portion 99c extending in an external diameter direction. A side face of this clutch operating portion, which faces forward in the axial direction, is in contact with a protrusion 32e formed on a face of a rearward side of the front face portion 32a of the front cover 32 in the axial direction. As a result, the positioning of a compression (end of stroke) side (a take off clutch release position) of the piston 99 is established.

The hub 33h of the center piece 33 is prevented from slipping out of place by the snap ring and fixed to a retaining plate 102. A return spring 103 is provided in a compressed state between the retaining plate 102 and a back face of the piston 99. On the other hand, the center piece 33 has a recess 105 formed in the hub portion 33h side. An input shaft 21 of the automatic transmission is fitted into the recess 105. An oil hole 21a passes through the input shaft 21 in the axial direction. The oil hole 21a has an opening at the axial leading end and a seal ring 106 is mounted between the input shaft 21 and the recess 105.

An oil hole 107 is also formed in the center piece 33 and extends substantially in an external periphery direction from the recess 105, so that hydraulic pressure from the oil hole 21a of the input shaft 21 is introduced from an opening of a leading end of the oil hole 107 through an oil passage into a hydraulic chamber of the actuator 94.

A boss 109 serving as an output side of the take off device 90 is splined and coupled to the input shaft 21. The damper unit 91 is housed in a large diameter housing portion E constituted by the external diameter portion 32c of the front cover 32, the rear cover $57_2$, and the like, which is provided at an external diameter side of the boss. It should be noted that, the take off clutch 90 and the hydraulic actuator 94 are disposed in a small diameter housing portion F which is provided at of the middle tubular portion 32b in the front cover 32.

On the other hand, the boss 109 has thrust bearings 110 and 111 interposed between a front face of the rear hub $59_2$ and a back end face of the center piece 33. Both of the thrust bearings 110 and 111 support the boss 109 and the damper unit 91 integrated therewith, while restricting movement in the axial direction with respect to the housing 93.

Further, a spline formed on an inner peripheral face of the boss 109 is engaged with a spline formed on the input shaft 21. On the input shaft 21, a sleeve shaft 112 is also supported via a bush 113. A leading end of the sleeve shaft 112 is fitted so as to be oil-tight over the boss 109, with a seal ring interposed between them. Further, the rear hub $59_2$ is disposed at an external diameter side of the sleeve shaft 112 with a predetermined void between the rear hub $59_2$ and the sleeve shaft 112. The rear hub $59_2$ is rotatably supported by the oil pump case 52 that is fixed to the transmission case, via the bush 60 (see FIG. 1).

Accordingly, a first oil passage communicating an oil passage in the transmission case and the inside of the housing 93 of the take off device $5_2$ is formed between the sleeve shaft 112 and the input shaft 21 by the void, the spline that has teeth cut in a portion thereof, and the like. Similarly, a second oil passage is formed between the sleeve shaft 112 and the tubular portion of the rear hub $59_2$ by the void. Accordingly, an oil circulation passage is formed in which lubricating oil from the transmission case is supplied from one of the first and second oil passages to the housing 93, and drained from the other oil passage. The lubricating oil is drained after lubricating each component, such as the thrust bearings 110 and 111, the take off clutch, the damper unit 91, and so on, in the housing 93.

In addition, the damper unit 91 has drive plates 120 which can be connected to the output of the engine 3 and the motor/generator 2 via the countershaft 23; a middle plate 121; a driven plate 122 connecting to the input shaft 21; and coil springs (first and second springs) 125 and 126 provided between the drive plates 120 and the middle plate 121 and between the middle plate 121 and the driven plate 122, respectively. These coil springs 125 and 126 make it possible to satisfactorily transmit the driving force of the motor/generator 2 and the engine 3 to the automatic transmission while the impact rotation produced when engaging the starting clutch.

Specifically, the damper unit 91 has the middle plate 121 and the driven plate 122 which are formed in a substantially ring-like shape, and which have diameters that are different from each other. Further, the drive plates 120 disposed on both sides of the plates 121 and 122 are fixedly coupled to each other with a pin. The driven plate 122 is integrally secured to the boss 109 with a rivet 127. The middle plate 121 has a protrusion (not shown) protruding from the inner peripheral face of the plate 121 in an internal diameter direction. The first large-diameter (coil) spring 125 constituted by a double coil spring is provided in a compressed state between the aforementioned protrusion and another protrusion protruding from the driven plate 122 in the outer periphery direction thereof, which will be described later.

Further, the driven plate 122 is formed in a ring shape, and has the above protrusion (not shown) protruding from the external diameter of the ring shape in an external diameter direction, and a hole (not shown) formed in the ring-shaped portion and accommodating the second small diameter coil spring 126 compressed to a predetermined amount. In addition, the drive plates 120, which are fixedly coupled to each other on both sides of the middle plate 121 and driven plate 122 that are disposed on the same plane, have spring housings 120a and 120b for housing the first spring 125 and the second spring 126. The spring housing 120a has a circumferential length sufficient to accommodate the two adjacent first springs 125 together, for example, and similarly the spring housing 120b has a circumferential length having a predetermined clearance with respect to the second spring 126.

Accordingly, with the damper unit 91, first, torque of the drive plate 120 transmitted from the clutch hub 97 compresses one of the two adjacent first springs 125 from the spring housing 120a of the drive plate, and concurrently is transmitted to the protrusion of the middle plate 121. Then, torque that is transmitted to the protrusion of the middle plate 121 compresses the other adjacent first springs 125, and concurrently is transmitted to the driven plate 122 via the protrusion of the driven plate 122. Thereby, the two first springs 125 at the circumference act as though they are in series, with the middle plate 121 interposed, so that an impact force acting upon the drive plate 120 is absorbed in a long stroke (long travel) and transmitted to the driven plate 122.

Further, a predetermined relative rotation is produced between the drive plate 120 and driven plate 122 by the two first springs 125 acting in series. As a result, the clearance between one end of the spring housing 120b and the second spring 126 is eliminated, so that the second spring 126 is compressed at the end of the housing, and concurrently torque of the drive plate 120 is transmitted to the driven plate 122. Thereby, in addition to the absorption of the predetermined torque based on the compression of the first spring 125, compressive deformation force of the second spring 126 acts from the middle of the stroke, and the impact force is absorbed due to high resistance from the middle of the stroke. In this way, the two first springs 125 acting as in series via the middle plate 121, and the second spring 126 acting from the middle of the stroke, effectively absorb the impact rotation when the starting clutch is engaged, and concurrently the driving force of the motor/generator 2 and the engine 3 is effectively transmitted to the automatic transmission.

Next, a description will be given of a positional configuration of the take off device $5_2$, the motor/generator 2, and so on, in the embodiment. Specifically, as described above, the damper unit 91 is housed in the large diameter housing portion E located at the external diameter side inside the front cover 32, and the take off clutch is housed in the small diameter housing portion F located at the internal diameter side. Further, a space is formed at the exterior upward direction of the housing 93, namely, at the external diameter side of the middle tubular position 32b of the front cover 32. The motor/generator 2 is accommodated inside this space.

Figure 4:
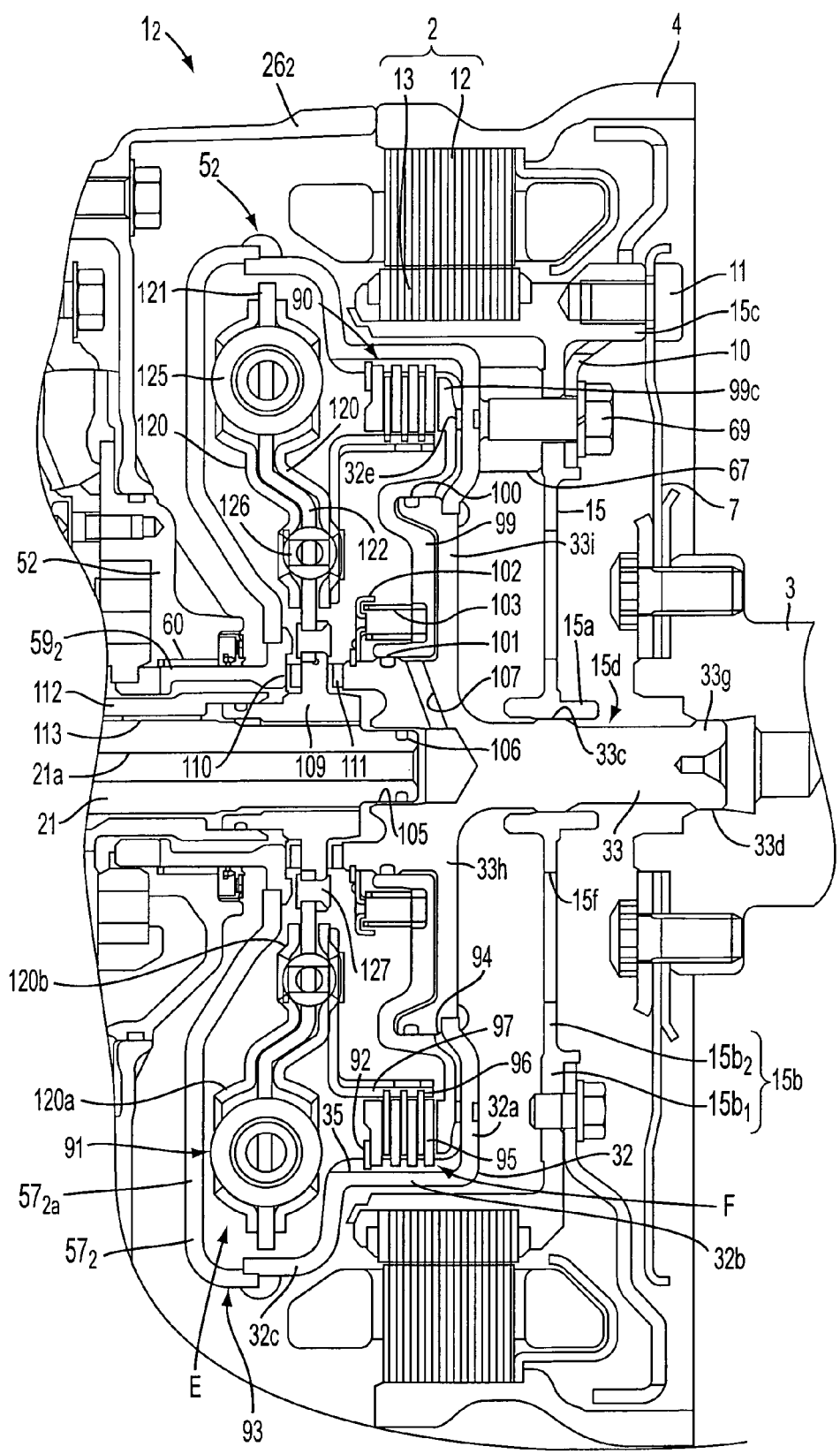
FIG. 4 is a cross section view illustrating an embodiment applied to a take off device having a multi-plate wet clutch and a damper spring.

The take off device $5_2$ is formed in a ring shape around the axis of the engine output shaft 3 and is provided with the take off clutch and the damper unit 91 that are disposed so as to be at a predetermined distance from each other in the axial direction (the right-left direction in FIG. 4). The take off clutch is disposed so as to overlap with the motor/generator 2 in the axial direction. The take off clutch is disposed in the radial direction (the vertical direction in FIG. 4) between the first spring 125 and the second spring 126 of the damper unit 91, so as to extend backwards toward the internal diameter side from the damper unit. Further, as described earlier, the motor/generator 2 includes the rotor 13 and stator 12, and the rotor 13 overlaps with the take off clutch at the position in the axial direction.

In the hybrid vehicle drive system 12 having the aforementioned structure, the take off clutch 90 and the damper unit 91 are disposed at a predetermined distance from each other in the axial direction. This makes it possible to achieve a compact structure of the damper unit as compared with a conventional structure having in-line placement of the damper unit 91 and the starting clutch 91 in the radial direction. With the appropriate combination of the damper unit 91 and the take off clutch 90, the configuration that allows the motor/generator 2 to produce torque required when starting the vehicle, and the like, provide a structure capable of smoothly transmitting the torque of the motor/generator 2 when starting the vehicle to the automatic transmission, through the take off clutch and the damper unit 91. In this case, a torque converter provided in conventional systems is not mounted. However, it is possible to use the motor/generator 2 instead in order to compensate for the torque increase effect that was provided by the torque converter. Thus, although the motor/generator 2 is mounted in addition to the engine 3, it is possible to shorten the dimensions in the axial direction of the entire system, since the expansion of the vehicle layout that is caused by mounting the torque converter is eliminated. In particular, both the take off clutch 90 and the damper unit 91, rather than just the take off clutch 90 alone, are housed substantially within the dimensions in the axial direction of the stator 12 in the embodiment, leading to a further improvement in reduction of the dimensions in the axial direction.

The torque converter is typically structured such that the lock-up clutch is engaged at the time when the pump impeller and the turbine runner rotate together and a certain speed is reached. However, the drive system $1_2$ is capable, due to the take off device $5_2$, of timing the forming of a direct connection between the engine and the transmission earlier so that it occurs earlier than that in a system using the torque converter. This makes it possible to extend the range of available vehicle speeds when the engine 3 and the automatic transmission are in a state of direct connection, as compared with the case of mounting a torque converter. Thus, it becomes possible to improve transmission efficiency and fuel economy.

Further, due to the take off clutch 90 and the damper unit 91 being disposed with space between them of a predetermined distance in the axial direction, it is possible to limit the increase in dimensions in the radial direction caused by providing the motor. In addition, the take off clutch 90 and the damper unit 91 are disposed such that they respectively overlap with the motor 2 in the axial direction. The disposal significantly contributes to the reduction in the dimensions in the axial direction. Still further, disposal of the take off clutch 90 at the internal diameter side from the damper unit 91, allows a structure to be realized in which the shape of the housing 93 of the take off device $5_2$ is determined in accordance with the take off clutch positioned at the internal diameter side and the motor/generator 2 is supported on the middle tubular portion 32b which is a step portion made by the damper unit 91 and the take off clutch 90. This makes it possible to provide a system structure in which an amount of protrusion of the motor/generator 2 toward the external diameter side is reduced as much as possible. Likewise, in view of the fact that the motor/generator 2 is located between the first and second springs 125 and 126 in the radial direction, a step portion 32b is provided between the damper unit 91 and the starting clutch $5_2$ adjacent thereto, as described above, and the rotor support member 15 of the motor/generator 2 and the like are coupled to the step portion in an appropriate manner, thereby making it possible to simplify the structure of the connection with the motor/generator 2.

The invention thus simplifies the process of mounting the system in the vehicle and facilitates the common use of production lines. Accordingly, attendant cost reductions can be expected. Further, since the impact rotation produced when the take off clutch is engaged is reliably absorbed in the damper unit 91 fulfilling the above description, it is possible to realize the structure of the system without mounting a torque converter. Given this, the vehicle speeds that can be utilized when the engine 3 and the automatic transmission are in the state of direct connection increase, as compared with a system mounting a torque converter. Thus, it is possible to improve transmission efficiency and enhance fuel economy.

Still further, the take off device $5_2$ includes the housing 93 serving as an input member accommodating the take off clutch and the damper unit 91. The motor 2 includes the stator 12 and the rotor 13. The rotor 13 has the rotor support member 15. While the support member 15 of the rotor 13 is connected to the input member (housing 93) of the take off device $5_2$ and the engine output shaft 3, the driving force is transmitted between the take off device $5_2$ and the engine output shaft 3 and the rotor 13. This eliminates the need for a fixed member (not shown) for direct rotational support of the rotor 13. The elimination of this fixed member makes it possible to shorten the dimensions of the system in the axial direction and reduce the size of system.

According to an exemplary aspect of the invention, the disk portion of the support pate is in contact with the center piece at a small area in the vicinity of the extension line of the plane on which the support plate is fixed to the front cover in order to execute centering. As such, the support plate is not forced to have relative inclination with respect to the center piece. Therefore, even if relative inclination occurs between the center piece and the support plate due to a degree of plane accuracy of a fixing face between the front cover and the disk, or the like, the inclination is permitted in order to prevent forced inclination from having an adverse effect on the accuracy of supporting the rotor. This makes it possible to improve centering accuracy.

According to another exemplary aspect of the invention, the support plate is attached at the external diameter side of the internal diameter portion of the front cover of the take off device. Such attachment allows torque transmission in a portion at a distance from the center, and thus a fixing and coupling portion between the front cover and the support plate is only required to have small strength. This makes it possible to give the coupling portion a compact structure and reduced weight.

According to another exemplary aspect of the invention, the outer shells of the take off device are supported by the fixed member integrated with the engine and the engine body in a double holding structure. Therefore the rotor integrated with the outer shells is supported by the fixed member with a high degree of centering accuracy. This structure of the rotor is combined with the structure securing the stator to the fixed member, which makes it possible to establish a small void (air gap) between the rotor and the stator. As a result, improvement in motor performance can be promoted.

According to another exemplary aspect of the invention, the front part of the take off device is supported at the center piece by the engine output shaft, and the rear part thereof is supported at the pump case by the hub of the rear case. Furthermore, the engine output shaft and the pump case are supported by the engine body, the motor housing, the take off device housing and the transmission case, which are all integrated. As such, the rotor, integrally fixed to the take off device, is hardly affected by an amount of eccentricity of the take off device itself, and thus is supported with a high degree of centering accuracy. The rotor combined with the structure that fixes the stator on the motor housing makes it possible to establish a small void between the rotor and stator, for improvement in motor performance.

According to another exemplary aspect of the invention, the disk of the rotor support plate is such that the external diameter, which is acted upon by torque between the motor and the take off device, has a large thickness that is sufficient to provide adequate strength, and the internal diameter portion acted upon by no torque has a small thickness that is sufficient to support a centering load. This structure makes weight reduction of the rotor possible.

According to another exemplary aspect of the invention, since the internal diameter portion of the disk portion of the rotor support plate has no relationship with the transmitted torque, it is possible to form the weight-reduction holes in the internal diameter portion in order to promote weight reduction of the rotor.

According to another exemplary aspect of the invention, torque is transmitted from the engine output shaft through the torque transmitting member to the fixing portion in which the support plate and the take off device are coupled and fixed. Hence, the portion of the disk portion extending in the internal diameter direction from the fixed portion is not acted upon by the torque from the engine output shaft. As a result, this portion need only be made sufficiently strong for the centering load, and does not require high strength. Accordingly, it is possible to promote weight reduction.

According to another exemplary aspect of the invention, because the torque transmitting member is formed from the flex plate, it is possible to lessen the effect of explosion vibrations of the engine output shaft, and the like, and to connect the rotor support plate and the engine output shaft. As a result, it is possible to reduce detrimental impacts on rotor support accuracy due to the connection with the engine output shaft.

It should be noted that, the hydraulic power transmission is preferably a torque converter, but is not limited to the torque converter. Hereinafter, all fluid couplings, and the like, are regarded as included within the concept of the hydraulic power transmission.

According to another exemplary aspect of the invention, use of the hydraulic power transmission as the take off device makes it possible to set the engine in either a halted state or a rotation state when the vehicle stops. Further, it is also possible for the vehicle state to be automatically select without switching. Moreover, it is possible to cause the motor to generate creep if the engine stops when vehicle stops, which makes it easily possible to generate the same driving feeling as in the case of a conventional automatic transmission. Still further, it possible to enhance the reliability of the hybrid vehicle drive system due to the high reliability of the hydraulic power transmission, such as the torque converter, or the like.

According to another exemplary aspect of the invention, the take off device has the starting clutch and the damper unit. Hence, it is possible to make the take off device a smaller size, as compared with the case of using a hydraulic power transmission such as a torque converter, or the like. Moreover, it is also possible to provide increased torque, even without mounting a torque converter, by using motor torque for assistance when starting.

What is claimed is:

1. A hybrid vehicle drive system, comprising:
   an automatic transmission having a take off device; and
   a motor having a stator and a rotor with an output from the motor and a engine being input to the take off device, wherein:
     the take off device has a front cover and a center piece protruding from the front cover with the center piece centered and supported on an output shaft of the engine,
     the rotor has a support plate supporting the rotor with the support plate having a disk portion extending in an internal diameter direction and defining a hollow portion,
     the support plate is centered by contacting the center piece at the hollow portion defined by the disk portions, and
     the support plate is fixed to the front cover at the disk portion by placing the center piece in the hollow portion.

2. The hybrid vehicle drive system according to claim 1, wherein the contact between the disk portion of the support plate and the center piece is at a relatively small portion in a vicinity of an extension line of a plane on which the disk portion is fixed to the front cover.

3. The hybrid vehicle drive system according to claim 1, wherein the front cover has an internal diameter portion disposed opposite and substantially in parallel to the disk portion of the support plate, and the disk portion of the support plate is fixed at an external diameter side of the internal diameter portion.

4. The hybrid vehicle drive system according to claim 1, further comprising:
   a fixed member with the stator fixed to the fixed member,
     wherein a first outer shell of the take off device is supported by the center piece at the output shaft of the engine, and a second outer shell of the take off device is supported by the fixed member.

5. The hybrid vehicle drive system according to claim 4, wherein a torque transmitting member is interposed between the engine output shaft and the support plate, and torque of the engine output shaft is transmitted to the take off device via the torque transmitting member, the fixing portion of the disk portion and the front cover.

6. The hybrid vehicle drive system according to claim 5, wherein the torque transmitting member has a flexible plate.

7. The hybrid vehicle drive system according to claim 1, wherein
   a motor housing, a take off device housing, and a transmission case are disposed in order from an engine position side in order to form an integrated case,
   the stator is fixed to the motor housing, and the engine output shaft is rotatably supported by the engine body,
   a pump case is fitted into an inner peripheral face of the integrated case and the pump case is fixed to the integrated case, and
   the take off device has an outer shell with the front cover and a rear cover integrally fixed to the front cover, a front portion of the outer shell is supported by the center piece at the engine output shaft and a back portion of the outer shell is supported at the pump case by a hub integrated with the rear cover.

8. The hybrid vehicle drive system according to claim 1, wherein the disk portion of the support plate has an internal diameter portion extending from a portion fixed to the front cover, the internal diameter portion being formed so as to be thinner than an external diameter portion of the disk portion.

9. The hybrid vehicle drive system according to claim 1, wherein the disk portion of the support plate has weight-reduction holes formed in an area extending from a portion fixed to the front cover to the internal diameter portion.

10. The hybrid vehicle drive system according to claim 1, wherein the take off device has a hydraulic power transmission.

11. The hybrid vehicle drive system according to claim 1, wherein the take off device has a starting clutch and a damper unit.

* * * * *